US008173204B2

(12) United States Patent
Rohland

(10) Patent No.: US 8,173,204 B2
(45) Date of Patent: May 8, 2012

(54) METHOD AND DEVICE FOR PRODUCING MEMBRANE-ELECTRODE UNITS

(75) Inventor: Lutz Rohland, Hanau-Grossauheim (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 1246 days.

(21) Appl. No.: 11/718,820

(22) PCT Filed: Nov. 9, 2005

(86) PCT No.: PCT/EP2005/012005
§ 371 (c)(1),
(2), (4) Date: Oct. 9, 2007

(87) PCT Pub. No.: WO2006/050933
PCT Pub. Date: May 18, 2006

(65) Prior Publication Data
US 2008/0086871 A1    Apr. 17, 2008

(30) Foreign Application Priority Data
Nov. 11, 2004  (DE) .................... 10 2004 054 503

(51) Int. Cl.
*H01M 4/88*    (2006.01)
*B05D 5/12*    (2006.01)
(52) U.S. Cl. .................... 427/115; 502/101; 429/535
(58) Field of Classification Search .................. 427/115; 502/101; 429/507, 534, 535
See application file for complete search history.

(56) References Cited

U.S. PATENT DOCUMENTS

| 5,738,905 | A | 4/1998 | Bevers |
| 5,761,793 | A | 6/1998 | Bevers et al. |
| 6,500,217 | B1 | 12/2002 | Starz et al. |
| 2003/0145545 | A1 | 8/2003 | Alderman |
| 2003/0191021 | A1 | 10/2003 | Ripley et al. |
| 2004/0083589 | A1* | 5/2004 | Steinfort et al. ............. 29/25.03 |

FOREIGN PATENT DOCUMENTS

| DE | 197 16 263 A1 | 10/1998 |
| DE | 19757492 A1 * | 7/1999 |
| DE | 10064462 A1 * | 7/2002 |
| DE | 102 43 046 A1 | 3/2004 |
| EP | 926753 A2 * | 6/1999 |
| EP | 1 037 295 A1 | 9/2000 |
| EP | 867248 B1 * | 12/2001 |
| EP | 1 365 464 A2 | 11/2003 |
| WO | WO 03/084748 A2 | 10/2003 |

* cited by examiner

*Primary Examiner* — Tracy Dove
(74) *Attorney, Agent, or Firm* — Smith, Gambrell & Russell, LLP

(57) ABSTRACT

The present invention relates to the technical field of electrochemistry and describes a method and an apparatus for producing fuel cell components, in particular membrane electrode units ("MEUs") for membrane fuel cells.

In the case of the method according to the invention, anode and cathode electrodes are applied to two neighboring heated rollers that are subjected to a vacuum. The applied vacuum has the effect that they are introduced exactly in position into a roller nip and then laminated with an ion-conducting membrane. Due to the extended heat influencing zone, high production rates are achieved with the method according to the invention.

The apparatus according to the invention comprises a rolling mill with heatable vacuum rollers. It has advantages due to the simple construction and the absence of transfer locations.

21 Claims, 3 Drawing Sheets

METHOD AND DEVICE FOR PRODUCING MEMBRANE-ELECTRODE UNITS

CROSS-REFERENCE TO RELATED APPLICATIONS

This application claims the benefit of priority of German Patent Application No. 10 2004 054 503.0 field Nov. 11, 2004, and International Application No. PCT/EP2005/012005 filed Nov. 9, 2005, both of which are relied on and incorporated herein by reference.

INTRODUCTION AND BACKGROUND

The present invention relates to the technical field of electrochemistry and describes a method and an apparatus for producing fuel cell components, in particular for producing membrane electrode units ("MEUs") for membrane fuel cells (PEMFC, DMFC) but also for other electrochemical devices such as electrolysers or sensors.

Fuel cells convert a fuel and an oxidizing agent spatially separated from one another, at two electrodes, into power, heat and water. Hydrogen, a hydrogen-rich gas or methanol can serve as the fuel, and oxygen or air as the oxidizing agent. The process of energy conversion in the fuel cell is distinguished by a particularly high efficiency. For this reason, fuel cells in combination with electric motors are acquiring considerable importance as an alternative to conventional internal combustion engines. However, they are also increasingly being used for stationary and portable applications.

The polymer electrolyte membrane fuel cell ("PEM" fuel cell) is distinguished by a compact design, a high power density and a high efficiency. The technology of the fuel cells is described in detail in the literature, cf. for example K. Kordesch and G. Simader, "Fuel Cells and their Applications", VCH Verlag Chemie, Weinheim (Germany) 1996.

A PEM fuel cell stack consists of a stacked arrangement ("stack") of individual PEM fuel cells, which in turn consist of membrane electrode units ("MEU"s), between which so-called bipolar plates for gas supply and power conduction are arranged. In order to achieve a certain cell voltage, a large number of individual membrane electrode units are stacked one behind the other.

A membrane electrode unit, as described in the present application, has, as a rule, five layers and consists preferably of an ion-conducting membrane which is connected on both sides in each case to an electrode ("5-layered MEU"). Each electrode in turn comprises a gas diffusion substrate, also known as a gas diffusion layer ("GDLs"), which is provided with a catalyst layer.

The catalyst layer on the anode is formed for the oxidation of hydrogen, so the corresponding electrode is referred to as the "anode electrode", or the "anode" for short.

The catalyst layer on the cathode is formed for the reduction of oxygen. The corresponding electrode is therefore referred to as the "cathode electrode", or the "cathode" for short.

The gas diffusion substrates (GDLs) are generally based on substrates which permit good access of the reaction gases to the electrodes and good conduction of the cell current. They may consist of porous, electrically conductive materials, such as carbon fibre paper, carbon fibre nonwovens, woven carbon fibre fabrics, metal meshes, metallized fibre fabrics and the like.

For gas-tight sealing of the MEUs on installation in fuel cell stacks, the MEUs may furthermore contain sealing materials, reinforcing materials or optionally protective films in the edge region. In this way, more highly integrated MEU products can also be produced (for example "7-layered MEUs").

Bipolar plates (also referred to as "separator plates"), which, as a rule, are produced from conductive graphite and have channels for the gas supply and gas removal, are mounted between the MEUs.

Anode and cathode electrodes contain electrocatalysts which catalytically oxygen). As a rule, noble metal-containing catalysts which contain finely dispersed noble metals, such as, for example, platinum, palladium, ruthenium, gold or combinations thereof, are used for this purpose. Carbon black-supported catalysts of the type Pt/C or PtRu/C, which comprise finely dispersed platinum or platinum/ruthenium on a conductive carbon black surface, are preferred. Typical noble metal loads of the catalyst-coated electrodes are from 0.1 to 0.5 mg Pt/cm$^2$ for the anode side and from 0.2 to 1 mg Pt/cm$^2$ for the cathode side. On the anode side, special PtRu-containing catalysts are used for operation with reformate gas.

The ion-conducting membrane preferably consists of proton-conducting polymer materials. A tetrafluoroethylene/fluorovinyl ether copolymer having acid functions, in particular sulphonic groups, is used with particular preference. Such a material is sold, for example, under the trade name Nafion® by E.I. DuPont. However, it is also possible to use other, in particular fluorine-free, ionomer materials, such as sulphonated polyether ketones, sulphonated polyaryl ketones, doped polybenzimidazoles and/or inorganic ionomers.

Various methods for producing components for fuel cells are described in the literature:

EP 1 365 464 A2 discloses a continuous process for producing gas diffusion layers for PEM fuel cells. A laminating method is not mentioned.

EP 1 037 295 B1 describes a method for applying electrode layers to an ionomer membrane in ribbon form by means of a screen printing process.

EP 868 760 B1 discloses a continuous method for producing membrane-electrode composites. In this case, the ion-conducting membrane is laminated and bonded with the contacting material in ribbon form in a roller arrangement.

WO 03/084748 A2 discloses a method and an apparatus for producing membrane electrode units. The MEUs are in this case produced using an ionomer membrane in ribbon form by lamination on both sides with electrodes (i.e. gas diffusion substrates) or catalyst-coated substrates (so-called "decals"). The electrodes or substrates, previously cut to size in a punching device, are transported to the laminating location with the aid of vacuum belts and are laminated there with the polymer electrolyte membrane. This method has the following disadvantages:

a) The vacuum belts used lead to a high degree of complexity of the apparatus, which results in higher costs, complicated measurement and control technology and increased servicing work.

b) The feeding by means of vacuum belts implies transfer locations to the rollers. As a result, the size of the electrodes is limited in the downward direction for geometrical reasons; it is not possible to produce MEUs to any small size that may be desired.

c) The use of vacuum belts limits the heat influencing zone for the electrodes or substrates to the region of the roller nip. This narrow heating zone has the effect that there is insufficient heat transmission during the laminating process, in particular if relatively high production rates have to be realized. The system capacity of such an apparatus is therefore limited.

SUMMARY OF THE INVENTION

The object of the present invention is therefore to provide a simple, improved method for producing membrane electrode units and to propose a corresponding improved apparatus.

This object is achieved by the invention with the features of the independent claims. Advantageous embodiments of the invention are characterized in the subclaims.

In particular, the object is achieved by a method for producing a membrane electrode unit which comprises the following steps:
- a) Applying the respective electrodes to two neighbouring rollers that are subjected to a vacuum
- b) Feeding the applied electrodes into the roller nip between the two rollers and
- c) Pressing the electrodes with an ion-conducting membrane.

The object is also achieved by a device which has at least two rotating rollers, the rollers being heatable vacuum rollers.

Furthermore, the object is achieved by a system for producing a membrane electrode unit comprising one of the devices according to the invention, the device being coupled to a pick-and-place system.

The present invention avoids the disadvantages of the prior art, in that it provides a rolling press with heatable vacuum rollers. Consequently, the vacuum required for fixing the electrode substrates is integrated in the rolling press. Additional subassemblies such as vacuum belts are no longer required; the method and device are simplified considerably. Costs for investment and maintenance are lowered, efficiency is increased. Since the vacuum belts are no longer required, there are no longer any transfer locations within the apparatus according to the invention. The size of the electrodes is consequently not limited in the downward direction, which is of great benefit in particular against the background of miniaturization efforts in the fuel cell industry.

In particular, the electrodes can be heated through very well after they have been placed on the vacuum rollers. The heat influencing zone is considerably extended in comparison with conventional apparatuses; for this reason, higher operating speeds and higher production rates can be realized. In spite of an extremely simple configuration, high production rates with cycle times of around 0.3 seconds can be achieved with the method described and the associated device.

It has surprisingly been found that the device described can be completely independent of the dimensions of the electrodes up to the width of its rollers. The electrodes can be positioned on the vacuum rollers directly by a commercially available pick-and-place unit. For example, when the system according to the invention is used, laborious mechanical alignment is no longer required, if there is a change of format it is just necessary for example to reprogram a robot that is used. Since this can, for example, often also take place offline, no setting-up and standstill times occur when there is a change of format. Additional tool costs are also not incurred.

The electrodes may be cut in advance on a commercially available diecutting die. Such dies are significantly cheaper than cutting dies for rotary diecutting. In addition, gas diffusion substrates (GDLs), which are commercially available only as sheet stock, can be further processed.

BRIEF DESCRIPTION OF DRAWINGS

Further features and advantages of the present invention are evident from the subsequent description and the accompanying claims in conjunction with the appended drawings, the drawings representing the following:

DETAILED DESCRIPTION OF THE INVENTION

Figure 1:
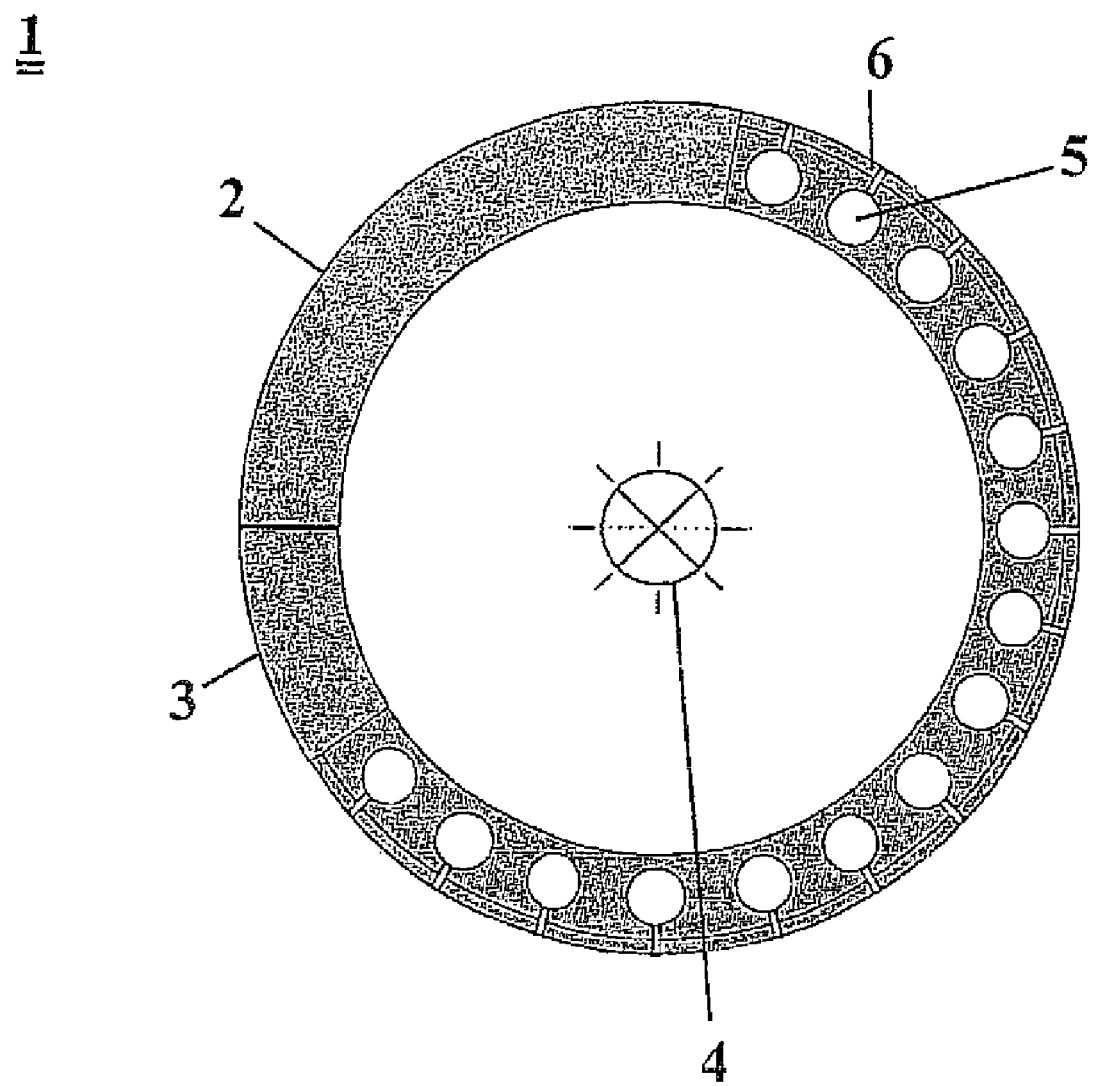
FIG. 1 shows the plan view of the front side of a roller (1) of an embodiment of the apparatus according to the invention. The bore holes, which are subjected to a vacuum or blowing air, are covered by corresponding slides.
Figure 2:
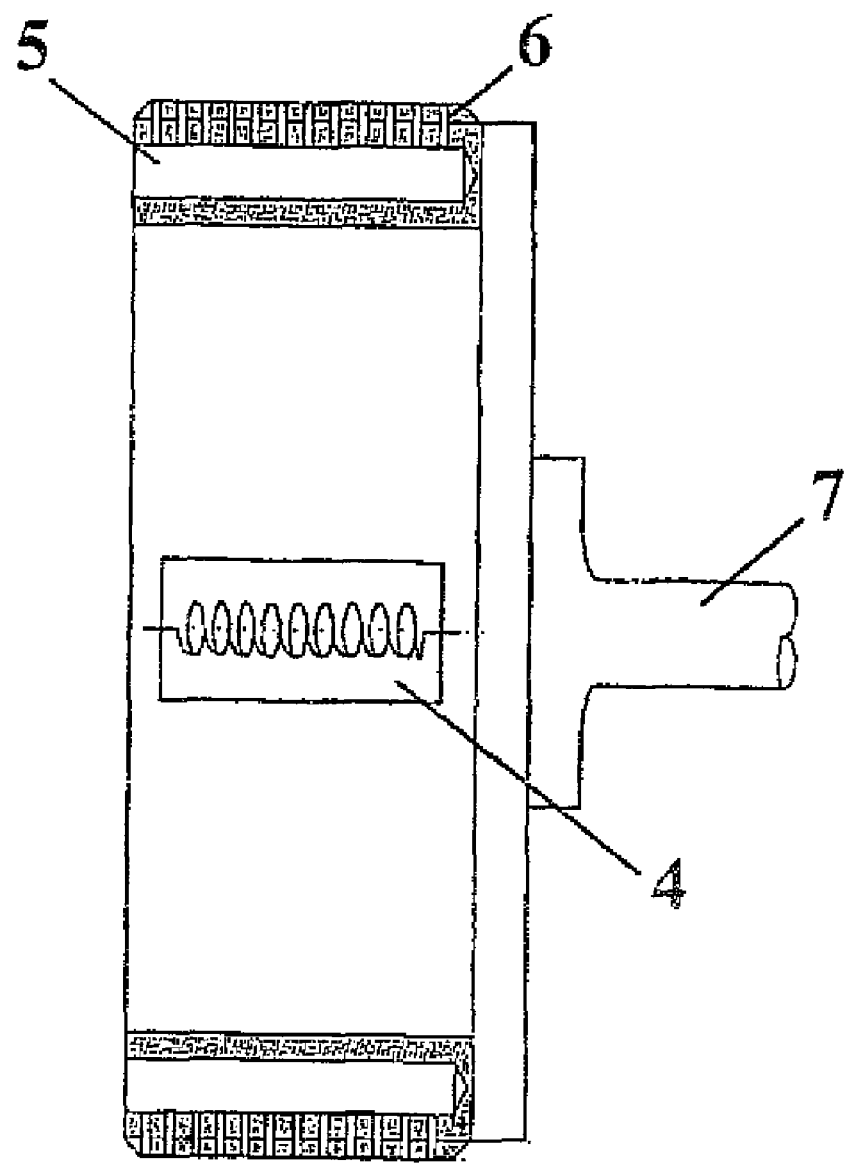
FIG. 2 shows an axial section of an embodiment of the apparatus according to the invention.
Figure 3:
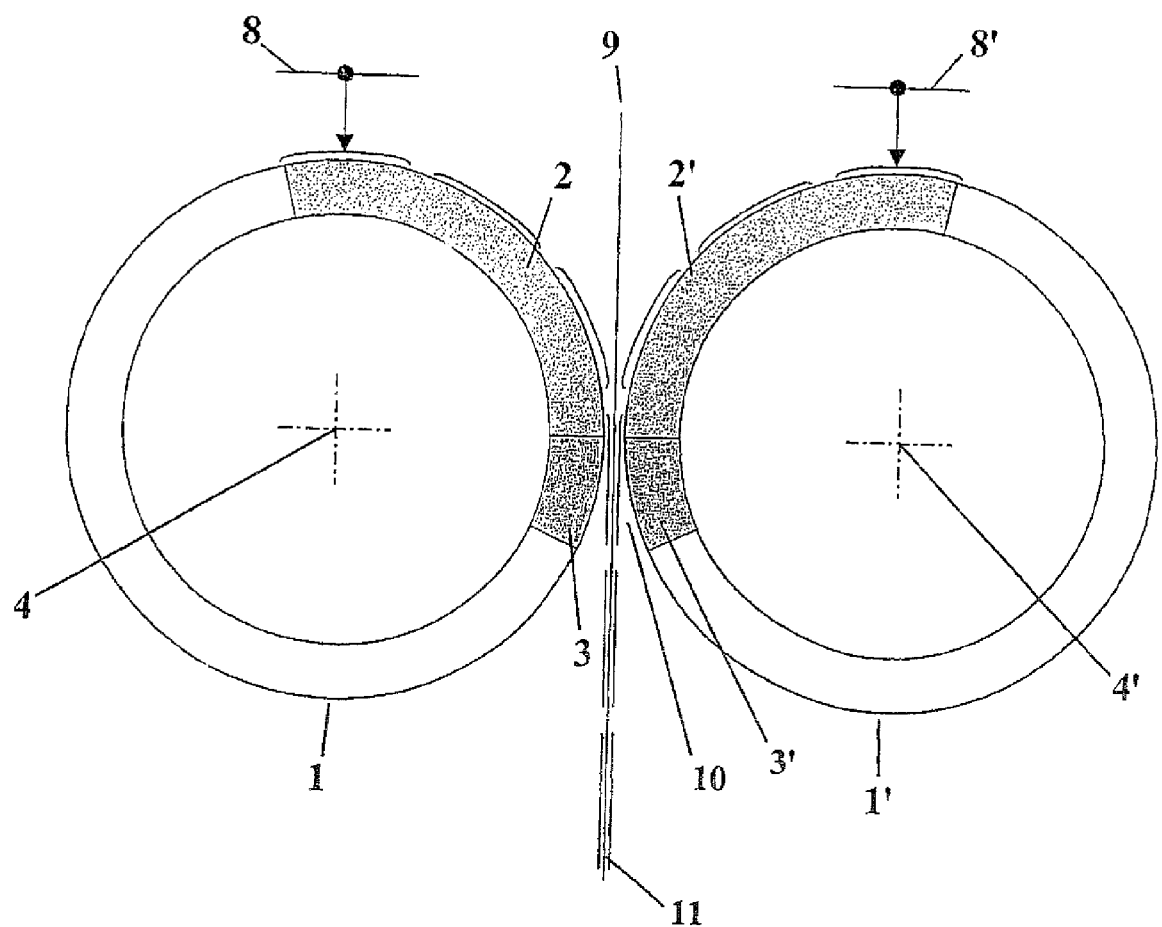
FIG. 3 shows a cross section through both rollers (1, 1') of an embodiment of the apparatus according to the invention during the production of membrane electrode units.

The device according to the invention comprises at least two rotating rollers (1, 1'), which preferably rotate in a synchronized manner and in opposite directions. The rollers may be cantilevered and driven on the bearing side, cf. drive shaft (7). The rollers (1, 1') have vacuum zones (2, 2') and blowing zones (3, 3'). In a particularly preferred embodiment, the rollers may be configured as hollow shafts which can be heated to the desired surface temperature from the inside, for example by means of a controlled infrared radiator (4). In a further embodiment, however, it is also possible to configure the heating as electrical heating panels, applied to the inner surface of the hollow shaft for example with a clamping ring. Typical surface temperatures of the rollers are in the range from 130 to 220° C., preferably in range from 150 to 190° C.

The wall of the hollow shaft may be provided with axial distribution bore holes (5), which can be subjected to vacuum or blowing air in any desired segments by means of slides located on the front side (the non-mounted side). From the distribution bore holes, radial bore holes (6) may extend to the roller surface, the suction effect of which can be used to fix exactly in position the electrodes placed on the surface of the respective roller. In a particularly preferred configuration, the rollers are additionally provided with a flexible coating, such as for example with silicone rubber, which increases the width of the pressure influencing zone and reduces the pressure gradient.

One of the two rollers is preferably formed as a fixed roller. For the purposes of the invention, fixed roller means that the fixed roller is the primarily driven roller and can only perform a rotational movement about its axis. Electric motors, in particular servomotors or d.c. motors, may be used for example for the drive. The second roller is preferably formed as a loose roller, which can be arranged such that it is displaceable transversely to the roller axis on suitable linear guides. It is also possible to arrange the loose roller such that it oscillates on an arc of a circle. To exert the rolling force, the loose roller can be adjusted. In a particularly preferred embodiment of the present invention, this may take place by means of a pneumatic cylinder; in other embodiments, however, the adjustment may also take place for example by a hydraulic system or by means of a motor and spindle. The drive and synchronization of the loose roller may take place by means of a toothed belt, which may have a tensioning device, or by means of a functionally equivalent machine element. The circumferential speed of the rollers (1, 1') typically lies in the range from 50 to 500 m/h, preferably in the range from 100 to 300 m/h.

The adjustment by means of a force that can be set may be limited by a displacement stop, which is likewise variable and can be set according to the requirements of the respective product. For this purpose, an accurate, electronic displacement measuring means may be attached to the linear guide. It is also possible, however, to perform the setting for example by means of a micrometer screw.

All the auxiliary units required for operation of the apparatus are preferably arranged on the bearing side of the rollers. These include, for example, the drive motor, vacuum station, electrical devices, synchronization of the drive and adjustment of the loose roller. This arrangement has the advantage that the front side of the rollers is freely accessible, for example for the pick-and-place system. In this way it is possible for example to achieve the minimum possible travelling paths and cycle times for the robot or robots. In particular, it is readily possible to load both rollers with a single robot up to moderate production rates, whereby the efficiency of the apparatus is once again increased.

The electrodes are preferably available cut-to-size in a magazine, but they may also be picked from the diecutting base. For example, by means of a suitable gripper, such as a needle gripper, vacuum gripper or icing gripper, a correspondingly programmed robot (linear system or SCARA principle) can pick up the electrode and place it exactly in position on a first roller.

To achieve high accuracies, the position of the electrode on the gripper can be analysed during the travelling movement by an image processing system and the robot corrected to correspond to the setpoint value. After the positionally exact placement of the first electrode, the robot can grip the second electrode (possibly from a second magazine) and position it on the second roller.

In a further embodiment, two robots may also be used for this. In this case, the two electrodes can be placed exactly at the same time on the apex points of the first and second rollers by two robots equipped with grippers. The greater structural complexity is then offset by the advantage that the two electrodes can be placed on the apex points of the two rollers at synchronized times. By contrast, if a single robot is used, either the rolling mill has to be stopped for the duration of the pick-and-place process (about 0.5 sec) or else the placement position of the second electrode has to be computationally corrected by the amount of displacement from a point on the surface of the roller that has been traveled since the placement of the first electrode. Up to moderate production rates (depending on the size of format about 2500 items/h), the cost factor (one robot) can predominate; at higher production rates, the benefit factor can predominate (two robots).

The electrodes placed exactly in position on the rollers (1, 1') are held by the vacuum applied to the rollers and are fed to the roller nip by the rotational movement. The first roller is preferably subjected to a vacuum in the range from approximately 340°-90°, the second roller is preferably subjected to a vacuum in the range from approximately 270°-20°.

The vacuum used is typically at a negative pressure of 50 to 300 mbars and can be produced for example by a Venturi nozzle or side-channel blower. If a side-channel blower is used, no contamination of the air with oil or water takes place and the exhaust gas of the blower can be used particularly advantageously as blowing air in the next zone.

The roller nip may be formed by an adjustable stop on the loose roller. The setting can be performed according to the requirements of the product. The width of the roller nip is preferably greater than the thickness of the product, as to be achieved in the mounted stack under operating conditions. The limitation of the roller nip avoids inadmissibly high compression of the gas diffusion layers or electrodes, which could impair the function, and at the same time ensures that the ion-conducting membrane, which can run as ribbon-like material between the rollers in the roller nip synchronously with the circumferential speed of the rollers, is not subjected to loading or damaged outside the area contacted by the electrodes. The linear load that is effective during the pressing/laminating lies in the range from 50 to 300 N/cm width of the active area, preferably in the range from 80 to 200 N/cm.

The rolling pressure is preferably applied to the loose roller by one or more pneumatic cylinders. The rolling pressure may also be exerted by a hydraulic system or by means of a combination of an electric drive and a spindle.

In the roller nip, the heated-up electrodes, fixed on the rollers by vacuum, are brought into contact with the membrane running centrally through the roller nip as ribbon-like product and bonded under the influence of temperature and pressure. At this location, the vacuum zone ends and blowing air is introduced over the following 20° of the circumference, removing the composite that has been produced from the surfaces of the first and second rollers. In special cases, it is also possible in each case to allow an additional separating film to rotate synchronously with the corresponding roller in order to minimize further the adhesive forces, in particular of the membrane to the coating of the roller.

After one pass through the rolling mill, the finished composite is available for further processing. Depending on the form taken by the downstream process steps, the MEUs located on the membrane ribbon can be passed on for further processing either in an individually separated form or as ribbon-like product. The individual separation of the MEUs may take place discontinuously or continuously by diecutting dies, rotary diecutting dies, diecutting cutters, perforation rollers or guillotine shears.

EXAMPLE

In the present example, a machine which corresponds to the configurational aspects of the previous sections and has a roller body diameter of 300 mm is used. To prepare for the production run, a reel of the ionomer membrane (applied to a carrier film, covered with a protective film; Nafion® NR112, from DuPont; USA) is suspended in the machine and aligned. The apparatus has a device for delaminating both the carrier film and the protective film of the membrane, so that said membrane runs freely into the roller nip.

Furthermore, the anode and cathode electrodes, die-cut to the final dimensions (also referred to as CCBs—"Catalyst Coated Backings"), are placed into their respective magazines. The electrodes respectively comprise a gas diffusion substrate (GDL) of the type SGL Sigracet 30-BC (from SGL, Meitingen, Del.), which is coated with an anode catalyst or cathode catalyst. Carbon black-supported platinum in a formulation which contains 60% by weight of platinum is used as the catalyst. The suitable coating processes are known to a person skilled in the art.

Anode and cathode electrodes (CCBs) which have external dimensions of 71×71 mm are used. For the materials mentioned in the example, the stop of the loose roller is set to a distance between the roller surfaces of 600 µm, and an adjusting force of 850 N is chosen. The rollers are allowed to run at a circumferential speed of 160 m/h; the surface temperature is 170° C. The coated CCBs are stored in magazines, from which they are removed with a gripper. The gripper is mounted on a SCARA robot.

The circumferential speed of the rollers in the present example is 44.5 mm/sec (=160.2 m/h). The first electrode is placed by the robot on the apex point of the first roller. The second electrode is placed on the second roller one second later by the same robot in such a way that the centre line of the second electrode, parallel to the axis of rotation of the roller, lies 44.5 mm closer to the imaginary line of contact of the rollers than the apex point of the second roller, thereby compensating for the shifting forward of the first electrode on the first roller. The electrodes are immediately fixed at the placement point by the negative pressure of the rollers and released by the gripper. The rotational movement of the rollers has the effect that the electrodes are fed to the roller nip exactly in position. The working cycle is repeated in such a way that there is always the same distance between the electrodes on the roller surface, corresponding at least to twice the membrane rim intended for the final product.

In the roller nip, the electrodes fixed on the rollers by negative pressure are laminated exactly in position by means of pressure and temperature onto the membrane guided between them through the roller nip. Those chambers of the rollers which have passed the roller nip are subjected to blowing air over a circumferential angle of about 20°, so that the membrane sheet provided with electrodes easily detaches itself from the two rollers and runs out freely from the machine. Tension on the membrane sheet allows the laminates to be easily passed on for further processing, for example to a diecutting step. In the present example, the final product has an outer membrane rim of 100×100 mm$^2$. Accordingly, 6000 laminates per hour are obtained.

LIST OF REFERENCE NUMERALS

1/1' roller
2/2' vacuum zone
3/3' blowing zone
4/4' heat source
5 axial distribution bore hole
6 radial bore hole
7 drive shaft
8/8' electrodes (catalyst-coated anode and cathode)
9 ion-conducting membrane
10 roller nip
11 membrane-electrode unit

The invention claimed is:

1. A method for producing a membrane electrode unit for membrane fuel cells, comprising an anode electrode, a cathode electrode and an ion-conducting membrane arranged between the anode electrode and the cathode electrode, comprising:
    a) applying the electrodes to two neighboring hollow heated rollers that are subjected to a vacuum, the electrodes are applied to an outer surface of the hollow heated rollers,
    b) feeding the applied electrodes into a roller nip between the two hollow heated rollers, and
    c) pressing the electrodes with the ion-conducting membrane;
    wherein the hollow heated rollers include heat sources that apply heat to an inner surface of the hollow heated rollers.

2. Method according to claim 1, further comprising steps for individually separating the membrane-electrode units.

3. Method according to claim 1, wherein the vacuum applied to the two rollers is in the range from 50 to 300 mbar.

4. Method according to claim 1, wherein the electrodes consist of gas diffusion substrates which comprise porous, electrically conductive materials, provided with a catalyst layer.

5. Method according to claim 1, wherein the ion-conducting membrane contains organic ionomers and an inorganic ionomer.

6. Method according to claim 1, wherein the electrodes are diecut in advance.

7. Method according to claim 1, wherein the electrodes are applied to the rollers with the aid of at least one robot.

8. The method of claim 5 wherein a position of the electrodes on a gripper is analyzed during a travelling movement by an image processing system and the robot is corrected to correspond to a set point value.

9. Method according to claim 1, wherein the electrodes are placed on the rollers at synchronized times.

10. Method according to claim 1, wherein the electrodes are placed on the rollers at times separated by a delay.

11. Method according to claim 1, wherein the pressing of the electrodes with the ion-conducting membrane takes place with a linear load in the range from 50 to 300 N/cm.

12. Method according to claim 1, wherein the pressing of the electrodes with the ion-conducting membrane takes place with a surface temperature of the rolling rollers in the range from 130 to 220° C.

13. Method according to claim 1, wherein the circumferential speed of the rollers is in the range from 50 to 500 m/h.

14. Method according to claim 1, wherein the pressing of the respective electrodes is followed by blowing air to the surface of the rollers.

15. The method of claim 1 wherein the membrane electrode unit is highly integrated and comprises sealing materials, reinforcing materials or protective films.

16. Method according to claim 2, wherein the individual separation takes place by diecutting dies, rotary diecutting dies, diecutting cutters, perforation rollers or guillotine shears.

17. Method according to claim 4, wherein said electrically conductive materials are selected from the group consisting of carbon fibre paper, carbon fibre nonwovens, woven carbon fibre fabrics, metal meshes, metallized fibre fabrics and the like and are provided with a catalyst layer.

18. Method according to claim 5, wherein said organic ionomers are selected form the group consisting of fluorinated polymeric sulphonic acid derivatives, sulphonated polyether ketones, sulphonated polyaryl ketones, doped polysulfones and doped polybenzimidazoles.

19. Method according to claim 11, wherein the range is from 80 to 200 N/cm.

20. Method according to claim 12, wherein the range is from 150° to 190° C.

21. Method according to claim 13, wherein the range is from 100 to 300 m/h.

* * * * *